(12) United States Patent
Nord-Varhaug et al.

(10) Patent No.: US 8,044,160 B2
(45) Date of Patent: Oct. 25, 2011

(54) POLYETHYLENE COMPOSITION FOR INJECTION MOLDED CAPS AND CLOSURE ARTICLES

(75) Inventors: Katrin Nord-Varhaug, Porsgrunn (NO); Svein Staal Eggen, Langangen (NO); Hans Joerg Fell, Porsgrunn (NO)

(73) Assignee: Borealis Technology Oy, Porvoo (FI)

( * ) Notice: Subject to any disclaimer, the term of this patent is extended or adjusted under 35 U.S.C. 154(b) by 401 days.

(21) Appl. No.: 11/718,019

(22) PCT Filed: Nov. 2, 2005

(86) PCT No.: PCT/EP2005/011716
§ 371 (c)(1),
(2), (4) Date: Jun. 11, 2009

(87) PCT Pub. No.: WO2006/048253
PCT Pub. Date: May 11, 2006

(65) Prior Publication Data
US 2009/0253863 A1    Oct. 8, 2009

(30) Foreign Application Priority Data
Nov. 3, 2004 (EP) .................... 04026098

(51) Int. Cl.
C08F 10/02 (2006.01)
C08F 10/08 (2006.01)
C08F 110/02 (2006.01)
C08F 210/02 (2006.01)
C08F 210/08 (2006.01)
C08F 210/16 (2006.01)

(52) U.S. Cl. ....... 526/352; 526/65; 526/124.5; 526/348; 526/348.6; 215/316; 264/299

(58) Field of Classification Search ............. 526/65, 526/124.5, 348, 348.6, 352
See application file for complete search history.

(56) References Cited

U.S. PATENT DOCUMENTS

| | | | |
|---|---|---|---|
| 5,015,511 A * | 5/1991 | Treybig et al. | 428/34.1 |
| 5,189,106 A * | 2/1993 | Morimoto et al. | 525/240 |
| 6,191,227 B1 | 2/2001 | Matsuoka et al. | |
| 2002/0045711 A1 | 4/2002 | Backman et al. | |
| 2003/0055176 A1 | 3/2003 | Jacobsen et al. | |
| 2005/0004315 A1 | 1/2005 | De Cambry De Baudimont et al. | |
| 2006/0051538 A1 | 3/2006 | Maziers | |

FOREIGN PATENT DOCUMENTS

| | | |
|---|---|---|
| EP | 0688794 | 12/1995 |
| EP | 0810235 | 12/1997 |
| EP | 1460105 | 9/2004 |
| JP | 58-103542 | 6/1983 |
| WO | 92/12182 | 7/1992 |
| WO | 96/18662 | 6/1996 |
| WO | 97/03124 A1 | 1/1997 |
| WO | WO 9744371 A1 * | 11/1997 |
| WO | 00/22040 | 4/2000 |
| WO | 00/71615 A1 | 11/2000 |
| WO | 03/037941 | 5/2003 |
| WO | 2004/055068 | 7/2004 |
| WO | 2004/055069 | 7/2004 |
| WO | 2005/14680 A1 | 2/2005 |

OTHER PUBLICATIONS

Soares, J. B. P., Kim, J. D., and Rempel, G. L., "Analysis and Control of the Molecular Weight and Chemical Composition Distributions of Polyolefins Made with Metallocene and Ziegler-Natta Catalysts", Ind. Eng. Chem. Res. 1997, 36(4), 1144-1150.*
The Dow Chemical Company, Notice of Opposition against EP 1,655,336 B1, Oct. 10, 2007.*
Borealis Technology Oy, Reply to Notice of Opposition against EP 1,655,336 B1, Mar. 26, 2008.*
HDPE 35060E, High Density Polyethylene Resin. "Blow Moulding and Extrusion Resin". Dow Plastics. Apr. 2000.
HDPE 35060E, High Density Polyethylene Resin. "Technical Information—Blow Moulding and Extrusion Resin". Dow Plastics. Aug., 2005.

* cited by examiner

*Primary Examiner* — Vasu Jagannathan
*Assistant Examiner* — Richard A Huhn
(74) *Attorney, Agent, or Firm* — Roberts Mlotkowski Safran & Cole, P.C.

(57) ABSTRACT

The present invention relates to a multimodal polyethylene composition wherein (i) the composition has an $MFR_2$ of 0.1 to 100 g/10 min, (ii) the shear thinning index $SHI_{(1,100)}$ and the log $MFR_2$ of the composition satisfy the following relation: $SHI_{(1,100)} \geq -10.58$ log $MFR_2$ [g/10 min]/(g/10 min)+ 12.94, and (iii) the composition has an environmental stress crack resistance ESCR of 10 h or more. Furthermore, the present invention relates to a process for the production of said composition, an injection moulded article, in particular a cap or closure, comprising said composition and to the use of said composition for the production of an injection moulded article.

20 Claims, No Drawings

POLYETHYLENE COMPOSITION FOR INJECTION MOLDED CAPS AND CLOSURE ARTICLES

The present invention relates to a polyethylene composition for injection moulded articles, in particular for caps and closure articles. Furthermore, the present invention relates to a process for the production of said composition, an injection moulded article comprising said composition and to the use of said composition for the production of an injection moulded article.

Injection moulding may be used to make a wide variety of articles including articles having relatively complex shapes and a range of sizes. Injection moulding is, for instance, suited to the manufacture of articles used as caps and closures for food and drink applications, such as for bottles containing carbonated or non-carbonated drinks, or for non-food applications like containers for cosmetics and pharmaceuticals.

Injection moulding is a moulding process in which a polymer is melted and then filled into a mould by injection. During initial injection, a high pressure is used and the polymer melt is compressed. Thus, upon injection into the mould the polymer melt initially expands or "relaxes" to fill the mould. The mould, however, is at a lower temperature than the polymer melt therefore as the polymer melt cools, shrinkage tends to occur. To compensate for this effect, further polymer melt may be slowly injected into the mould. Thereafter the polymer melt is cooled further to enable the moulded article to be removed from the mould without causing deformation.

An important property of the polymer to be injection moulded is therefore its rheology. Rheology is a measure of non-Newtonian melt flow and it is crucial in injection moulding that the polymer melt have a flow within certain limits to ensure that the final product properties are desirable. For example, the flow of the polymer melt must be sufficiently high to enable it to flow to all areas of the mould and thus to form an article of the desired shape. Also, the higher the flow of the polymer melt the greater the speed at which it can be injected into the mould and the shorter the processing time.

Polyethylenes conventionally used for injection moulding are such having a narrow molecular weight distribution to reach the desired impact strength and stiffness, on the sacrifice of good flow properties. Thus, for improving the flow properties, polyethylenes with broader molecular weight distribution have been made or with lower average molecular weight (higher $MFR_2$). However, polymers having broad molecular weight distributions tend to yield products having poorer stiffness and poor impact properties and polymers with lower molecular weight tend to yield products having poor impact strength and poor environmental stress crack resistance (ESCR) properties. Thus, the performance of injection moulded articles made of such polymers in applications such as caps and closures where e.g. stiffness and ESCR are important, is reduced.

One way in which this problem has been addressed is to heat the moulding polymer to a higher temperature prior to injection. Since flow increases with increasing temperature, this allows polymers having poorer flow properties, but better stiffness and impact strength, to be used in an injection moulding process. The disadvantage of this strategy, however, is that the polymer melt needs to cool for a much longer period of time following filling into the mould in order to reach a temperature at which the moulded article can be removed from the mould without deformation. During this extended cooling time shrinkage is much more likely to occur. Also many fewer articles can be produced per unit of time and productivity is significantly decreased.

There remains a need therefore for a polymer composition suitable for use in injection moulding, in particular for caps and closures applications, which provides a combination of, on the one hand, superior flow properties which allow for easy processing even at low temperatures and hence allow for increased productivity (output), and, on the other hand, excellent mechanical properties including excellent stiffness, low creep, high durability, low shrinkage and a high degree of environmental stress cracking resistance (ESCR).

Furthermore, especially with regard to the food applications of caps and closures it is important that the composition has good taste and odour properties.

It is emphasized that although these properties at least in part are contrary to each other, e.g. high flow and high ESCR, to provide a polyethylene composition for injection moulding, each of them must be achieved.

It has now been surprisingly found that by providing a polyethylene composition having a particular molecular weight distribution so that a specific relation between shear thinning index or spiral flow and melt flow rate of the composition is achieved, a composition which not only has excellent rheological, i.e. flow, properties but also good mechanical properties such as stiffness and ESCR after injection moulding is furnished. In addition, the composition also has good taste and odour properties.

Accordingly, the present invention provides in a first embodiment a polyethylene composition wherein (i) the composition has an $MFR_2$ of 0.1 to 100 g/10 min,
(ii) the shear thinning index $SHI_{(1,100)}$ and the log $MFR_2$ of the composition satisfy the following relation:

$$SHI_{(1,100)} \geq -10.58 \log MFR_2 \text{ [g/10 min]/(g/10 min)} + 12.94, \text{ and}$$

(iii) the composition has an environmental stress crack resistance ESCR of 10 h or more.

Preferably, in the composition according to the first embodiment the spiral flow and the $MFR_2$ of the composition satisfy the following relation:

$$\text{Spiral flow}_{(1000 \, bar)} \text{ [cm]} \geq 2 MFR_2 \text{ [g/10 min]cm/(g/10 min)} + 41.$$

The present invention in a second embodiment provides a polyethylene composition wherein (i) the composition has an $MFR_2$ of 0.1 to 100 g/10 min, and
(ii) the spiral flow and the $MFR_2$ of the composition satisfy the following relation:

$$\text{Spiral flow}_{(1000 \, bar)} \text{ [cm]} \geq 2 MFR_2 \text{ [g/10 min]cm/(g/10 min)} + 41,$$

(iii) and the composition has an environmental stress crack resistance ESCR of 10 h or more.

It has been found that the polyethylene compositions according to the invention provide a improved material suited for injection moulding, in particular for caps and closure applications, which combines very good flow properties with excellent mechanical properties, such as high stiffness. At the same time, the compositions according to the invention exhibit good ESCR and the injection moulded articles produced therewith show low warpage and good taste and odour properties. Due to the excellent flow properties of the compositions, a higher throughput in injection moulding can be reached, more complex moulds can be used and/or lower moulding temperatures can be used leading i.a. to decreased degradation of the polymer.

By ethylene copolymer is meant a polymer the majority by weight of which derives from ethylene monomer units. The comonomer contribution preferably is up to 10% by mol, more preferably up to 5% by mol, and may derive from other copolymerisable monomers, generally $C_{3-20}$, especially $C_{3-10}$, comonomers, particularly singly or multiply ethylenically unsaturated comonomers, in particular $C_{3-10}$ α-olefins such as propene, but-1-ene, hex-1-ene, oct-1-ene, 4-methyl-pent-1-ene etc.

In the following, preferred features for both embodiments of the polyethylene composition according to the invention are described.

The composition of the invention preferably comprises
(A) a first ethylene homo- or copolymer fraction, and
(B) a second ethylene homo- or copolymer fraction,
wherein
(iv) fraction (A) has a lower average molecular weight than fraction (B).

Usually, a polyethylene composition comprising at least two polyethylene fractions, which have been produced under different polymerisation conditions resulting in different (weight average) molecular weights and molecular weight distributions for the fractions, is referred to as "multimodal". Accordingly, in this sense the compositions of the invention are multimodal polyethylenes. The prefix "multi" relates to the number of different polymer fractions the composition is consisting of. Thus, for example, a composition consisting of two fractions only is called "bimodal".

The form of the molecular weight distribution curve, i.e. the appearance of the graph of the polymer weight fraction as function of its molecular weight, of such a multimodal polyethylene will show two or more maxima or at least be distinctly broadened in comparison with the curves for the individual fractions.

For example, if a polymer is produced in a sequential multistage process, utilising reactors coupled in series and using different conditions in each reactor, the polymer fractions produced in the different reactors will each have their own molecular weight distribution and weight average molecular weight. When the molecular weight distribution curve of such a polymer is recorded, the individual curves from these fractions are superimposed into the molecular weight distribution curve for the total resulting polymer product, usually yielding a curve with two or more distinct maxima.

In a further preferred embodiment, the shear thinning index $SHI_{(1,100)}$ and the log $MFR_2$ of the composition satisfy the following relation:

$SHI_{(1,100)} \geq -10.58 \log MFR_2$ [g/10 min]/(g/10 min)+ 13.94, and more preferably the shear thinning index $SHI_{(1,100)}$ and the log $MFR_2$ of the composition satisfy the following relation:

$SHI_{(1,100)} \geq -10.58 \log MFR_2$ [g/10 min]/(g/10 min)+ 14.94.

Further preferred, the shear thinning index $SHI_{(1,100)}$ and the log $MFR_2$ of the composition satisfy the following relation:

$SHI_{(1,100)} \leq -12.44 \log MFR_2$ [g/10 min]/(g/10 min)+ 30.5, and more preferably the shear thinning index SHI and the log $MFR_2$ of the composition satisfy the following relation:

$SHI_{(1,100)} \leq -12.44 \log MFR_2$ [g/10 min]/(g/10 min)+ 25.5.

The composition preferably has an shear thinning index $SHI_{(1,100)}$ of at least 4, more preferably of at least 5, still more preferably of at least 6, still more preferably of at least 8, and most preferably of at least 9.

The composition preferably has an shear thinning index $SHI_{(1,100)}$ of at most 40, more preferably of at most 30, and most preferably of at most 25.

Preferably, the shear thinning index $SHI_{(1,100)}$ and the $MFR_2$ of the composition satisfy the following relation:

$SHI_{(1,100)} \geq -1.44 MFR_2$ [g/10 min]/(g/10 min)+14, more preferably the shear thinning index $SHI_{(1,100)}$ and the $MFR_2$ of the composition satisfy the following relation:

$SHI_{(1,100)} \geq -1.44 MFR_2$ [g/10 min]/(g/10 min)+15, and most preferably the shear thinning index $SHI_{(1,100)}$ and the $MFR_2$ of the composition satisfy the following relation:

$SHI_{(1,100)} \geq -1.44 MFR_2$ [g/10 min]/(g/10 min)+16.

Furthermore, the shear thinning index $SHI_{(1,100)}$ and the $MFR_2$ of the composition preferably satisfy the following relation:

$SHI_{(1,100)} \leq -1.69 MFR_2$ [g/10 min]/(g/10 min)+32, and more preferably the shear thinning index SHI and the $MFR_2$ of the composition satisfy the following relation:

$SHI_{(1,100)} \leq -1.69 MFR_2$ [g/10 min]/(g/10 min)+27.

In a further preferred embodiment, the spiral flow$_{(1000\ bar)}$ and the $MFR_2$ of the composition according to the invention preferably satisfy the following relation:

Spiral flow$_{(1000\ bar)}$ [cm] $\geq 2 MFR_2$ [g/10 min]cm/(g/10 min)+42 and more preferably the spiral flow$_{(1000\ bar)}$ and the $MFR_2$ of the composition according to the invention satisfy the following relation:

Spiral flow$_{(1000\ bar)}$ [cm] $\geq 2 MFR_2$ [g/10 min]cm/(g/10 min)+43.

In a further preferred embodiment, the spiral flow$_{(1000\ bar)}$ and the $MFR_2$ of the composition according to the invention preferably satisfy the following relation:

Spiral flow$_{(1000\ bar)}$ [cm] $\leq 2 MFR_2$ [g/10 min]cm/(g/10 min)+53.

The spiral flow at 600 bar (spiral flow$_{(600\ bar)}$) of the compositions, which is measured as explained in detail below, preferably is 25 cm or more, more preferably is 27 cm or more and most preferably is 30 cm or more.

Furthermore, the spiral flow$_{(600\ bar)}$ of the compositions preferably is 40 cm or less, more preferably is 38 cm or less.

The spiral flow at 1000 bar (spiral flow$_{(1000\ bar)}$) of the compositions preferably is 38 cm or more, more preferably is 40 cm or more and most preferably is 42 cm or more.

Furthermore, the spiral flow$_{(1000\ bar)}$ of the compositions preferably is 60 cm or less, more preferably is 55 cm or less.

The spiral flow at 1400 bar (spiral flow$_{(1400\ bar)}$) preferably is at least 50 cm, more preferably at least 53 cm, still more preferably is at least 56 cm, and most preferably is at least 59 cm.

Furthermore, the spiral flow$_{(1400\ bar)}$ is preferably 75 cm or less, more preferably 70 cm or less.

The composition preferably has an $MFR_2$ of 0.3 or more, more preferably of 0.5 or more.

Further, the composition preferably has an $MFR_2$ of 50 or below, more preferably of 15 or below.

The composition preferably has an environmental stress crack resistance ESCR of 20 h or more, more preferably 40 h or more, more preferably of 60 h or more, still more preferably of 75 h or more, and most preferably of 100 h or more.

The density of the composition preferably is 930 kg/m³ or more, more preferably is 940 kg/m³ or more, still more preferably is 945 kg/m³ or more, still more preferably is 950 kg/m³ or more, still more preferably is 952 kg/m³ or more, and most preferably is 954 kg/m³ or more.

Furthermore, the density of the composition preferably is 980 kg/m³ or lower, and more preferably is 975 kg/m³ or lower.

Preferably, the composition of the invention has a tensile modulus of at least 800 MPa, more preferably at least 825 MPa, more preferably at least 850 MPa and most preferably at least 850 MPa. Typically, an upper limit for the tensile modulus is 1500 MPa. A typical range for the tensile modulus is 825 to 1200 MPa.

Preferably, the composition of the invention has a Charpy impact strength (23° C.) of 4 kJ/m² or more, more preferably 5 kJ/m² or more, still more preferably 7 kJ/m² or more and most preferably 8 kJ/m² or more. Usually, the compositions have a Charpy impact strength (23° C.) of up to 30 kJ/m², more preferably up to 40 kJ/m².

Furthermore, preferably the compositions have a Charpy impact strength (−20° C.) of 4 kJ/m² or more, more preferably of 5 kJ/m². Usually, the compositions have a Charpy impact strength (−20° C.) of up to 15 kJ/m², more preferably of up to 20 kJ/m².

The polyethylene composition preferably has a molecular weight distribution MWD, being the ratio of the weight average molecular weight $M_w$ and the number average molecular weight $M_n$, of 10 or more, more preferably of 15 or more, still more preferably of 17 or more, still more preferably of 20 or more, and most preferably of 22 or more.

Furthermore, the composition preferably has an MWD of 60 or below, more preferably of 40 or below and most preferably of 35 or below.

The weight average molecular weight $M_w$ of the composition preferably is at least 50 kD, more preferably at least 80 kD, and most preferably at least 100 kD. Furthermore, the $M_w$ of the composition preferably is at most 250 kD, more preferably 230 kD.

The composition preferably has a crystallinity of 55 to 90%, preferably 65 to 90%. Crystallinity is determined by DSC analysis.

Preferably, the crystalline melting point of the composition is between 125 and 140° C. as determined by DSC analysis.

Further preferred, the weight ratio of fraction (A) to fraction (B) in the composition is in the range 30:70 to 70:30, more preferably 35:65 to 65:35, most preferably 40:60 to 60:40.

Fractions (A) and (B) may both be ethylene copolymers or ethylene homopolymers, although preferably at least one of the fractions is an ethylene copolymer.

Preferably, the composition comprises an ethylene homopolymer and an ethylene copolymer component.

Where one of the components is an ethylene homopolymer, this is preferably the component with the lower weight average molecular weight ($M_w$), i.e. fraction (A).

The lower molecular weight fraction (A) preferably has an $MFR_2$ of 10 g/10 min or higher, more preferably of 50 g/10 min or higher, and most preferably 100 g/10 min or higher.

Furthermore, fraction (A) preferably, has an $MFR_2$ of 1000 g/10 min or lower, preferably 800 g/10 min or lower, and most preferably 600 g/10 min or lower.

The weight average molecular weight $M_w$ of fraction (A) preferably is 10 kD or higher, more preferably is 20 kD or higher.

Furthermore, $M_w$ of fraction (A) preferably is 90 kD or lower, more preferably 80 kD or lower, and most preferably is 70 kD or lower.

Preferably, fraction (A) is an ethylene homo- or copolymer with a density of at least 965 kg/m³.

Most preferably, fraction (A) is an ethylene homopolymer.

The higher molecular weight fraction (B) preferably has an $M_w$ of 60 kD or higher, more preferably of 100 kD or higher.

Furthermore, fraction (B) preferably has an $M_w$ of 500 kD or lower, more preferably of 400 kD or lower.

Preferably, fraction (B) is an ethylene homo- or copolymer with a density of less than 965 kg/m³.

Most preferably, fraction (B) is a copolymer. It may be noted that the term ethylene copolymer is used herein to relate to a polyethylene deriving from ethylene and one or more copolymerisable comonomers. Preferably, the copolymer component(s) of the composition of the invention will contain at least 0.001 mol %, more preferably at least 0.005 mol %, and most preferably at least 0.01 mol % of non-ethylene comonomer units. Furthermore, preferably the copolymer contains at most 1.5 mol %, more preferably at most 0.7 mol % and most preferably at most 0.3 mol % of such comonomer units.

Preferred ethylene copolymers employ alpha-olefins (e.g. $C_{3-12}$ alpha-olefins) as comonomers. Examples of suitable alpha-olefins include but-1-ene, hex-1-ene and oct-1-ene. But-1-ene is an especially preferred comonomer.

The polyethylene composition may also contain minor quantities of additives such as pigments, nucleating agents, antistatic agents, fillers, antioxidants, etc., generally in amounts of up to 10% by weight, preferably up to 5% by weight.

Where herein features of fractions (A) and/or (B) of the composition of the present invention are given, these values are generally valid for the cases in which they can be directly measured on the respective fraction, e.g. when the fraction is separately produced or produced in the first stage of a multistage process.

However, the composition may also be and preferably is produced in a multistage process wherein e.g. fractions (A) and (B) are produced in subsequent stages. In such a case, the properties of the fractions produced in the second step (or further steps) of the multistage process can either be inferred from polymers, which are separately produced in a single stage by applying identical polymerisation conditions (e.g. identical temperature, partial pressures of the reactants/diluents, suspension medium, reaction time) with regard to the stage of the multistage process in which the fraction is produced, and by using a catalyst on which no previously produced polymer is present. Alternatively, the properties of the fractions produced in a higher stage of the multistage process may also be calculated, e.g. in accordance with B. Hagström, Conference on Polymer Processing (The Polymer Processing Society), Extended Abstracts and Final Programme, Gothenburg, Aug. 19 to 21, 1997, 4:13.

Thus, although not directly measurable on the multistage process products, the properties of the fractions produced in higher stages of such a multistage process can be determined by applying either or both of the above methods. The skilled person will be able to select the appropriate method.

A multimodal (e.g. bimodal) polyethylene as hereinbefore described may be produced by mechanical blending two or more polyethylenes (e.g. monomodal polyethylenes) having differently centred maxima in their MWDs. Thus viewed from a further aspect the invention provides a process for the preparation of a polyethylene composition as hereinbefore described comprising blending two or more polyethylenes (e.g. monomodal polyethylenes) having differently centred maxima in their molecular weight distributions. Blending may be carried out in any conventional blending apparatus.

The monomodal polyethylenes required for blending may be available commercially or may be prepared using any conventional procedure known to the skilled man in the art. Each of the polyethylenes used in a blend and/or the final polymer composition may have the properties hereinbefore described for the lower molecular weight component, higher molecular weight component and the composition, respectively.

The polyethylene composition according the invention in the preferred embodiment where the composition comprises
(A) a first ethylene homo- or copolymer fraction, and
(B) a second ethylene homo- or copolymer fraction,
wherein fraction (A) has a lower average molecular weight than fraction (B), preferably is produced so that at least one of fractions (A) and (B), preferably (B), is produced in a gas-phase reaction.

Further preferred, one of the fractions (A) and (B) of the polyethylene composition, preferably fraction (A), is produced in a slurry reaction, preferably in a loop reactor, and one of the fractions (A) and (B), preferably fraction (B), is produced in a gas-phase reaction.

Preferably, the multimodal polyethylene composition may be produced by polymerisation using conditions which create a multimodal (e.g. bimodal) polymer product, e.g. using a catalyst system or mixture with two or more different catalytic sites, each site obtained from its own catalytic site precursor, or using a two or more stage, i.e. multistage, polymerisation process with different process conditions in the different stages or zones (e.g. different temperatures, pressures, polymerisation media, hydrogen partial pressures, etc).

Preferably, the multimodal (e.g. bimodal) composition is produced by a multistage ethylene polymerisation, e.g. using a series of reactors, with optional comonomer addition preferably in only the reactor(s) used for production of the higher/highest molecular weight component(s) or differing comonomers used in each stage. A multistage process is defined to be a polymerisation process in which a polymer comprising two or more fractions is produced by producing each or at least two polymer fraction(s) in a separate reaction stage, usually with different reaction conditions in each stage, in the presence of the reaction product of the previous stage which comprises a polymerisation catalyst. The polymerisation reactions used in each stage may involve conventional ethylene homopolymerisation or copolymerisation reactions, e.g. gas-phase, slurry phase, liquid phase polymerisations, using conventional reactors, e.g. loop reactors, gas phase reactors, batch reactors etc. (see for example WO97/44371 and WO96/18662).

Polymer compositions produced in a multistage process are also designated as "in-situ"-blends.

Accordingly, it is preferred that fractions (A) and (B) of the polyethylene composition are produced in different stages of a multistage process.

Preferably, the multistage process comprises at least one gas phase stage in which, preferably, fraction (B) is produced.

Further preferred, fraction (B) is produced in a subsequent stage in the presence of fraction (A) which has been produced in a previous stage.

It is previously known to produce multimodal, in particular bimodal, olefin polymers, such as multimodal polyethylene, in a multistage process comprising two or more reactors connected in series. As instance of this prior art, mention may be made of EP 517 868, which is hereby incorporated by way of reference in its entirety, including all its preferred embodiments as described therein, as a preferred multistage process for the production of the polyethylene composition according to the invention.

Preferably, the main polymerisation stages of the multistage process for producing the composition according to the invention are such as described in EP 517 868, i.e. the production of fractions (A) and (B) is carried out as a combination of slurry polymerisation for fraction (A)/gas-phase polymerisation for fraction (B). The slurry polymerisation is preferably performed in a so-called loop reactor. Further preferred, the slurry polymerisation stage precedes the gas phase stage.

Optionally and advantageously, the main polymerisation stages may be preceded by a prepolymerisation, in which case up to 20% by weight, preferably 1 to 10% by weight, more preferably 1 to 5% by weight, of the total composition is produced. The prepolymer is preferably an ethylene homopolymer (High Density PE). At the prepolymerisation, preferably all of the catalyst is charged into a loop reactor and the prepolymerisation is performed as a slurry polymerisation. Such a prepolymerisation leads to less fine particles being produced in the following reactors and to a more homogeneous product being obtained in the end.

The polymerisation catalysts include coordination catalysts of a transition metal, such as Ziegler-Natta (ZN), metallocenes, non-metallocens, Cr-catalysts etc. The catalyst may be supported, e.g. with conventional supports including silica, Al-containing supports and magnesium dichloride based supports. Preferably the catalyst is a ZN catalyst, more preferably the catalyst is non-silica supported ZN catalyst, and most preferably $MgCl_2$-based ZN catalyst.

The Ziegler-Natta catalyst further preferably comprises a group 4 (group numbering according to new IUPAC system) metal compound, preferably titanium, magnesium dichloride and aluminium.

The catalyst may be commercially available or be produced in accordance or analogously to the literature. For the preparation of the preferable catalyst usable in the invention reference is made to WO2004055068 and WO2004055069 of Borealis, EP 0 688 794 and EP 0 810 235. The content of these documents in its entirety is incorporated herein by reference, in particular concerning the general and all preferred embodiments of the catalysts described therein as well as the methods for the production of the catalysts. Particularly preferred Ziegler-Natta catalysts are described in EP 0 810 235.

The resulting end product consists of an intimate mixture of the polymers from the two or more reactors, the different molecular-weight-distribution curves of these polymers together forming a molecular-weight-distribution curve having a broad maximum or two or more maxima, i.e. the end product is a bimodal or multimodal polymer mixture.

It is preferred that the base resin, i.e. the entirety of all polymeric constituents, of the composition according to the invention is a bimodal polyethylene mixture consisting of fractions (A) and (B), optionally further comprising a small prepolymerisation fraction in the amount as described above. It is also preferred that this bimodal polymer mixture has been produced by polymerisation as described above under different polymerisation conditions in two or more polymerisation reactors connected in series. Owing to the flexibility with respect to reaction conditions thus obtained, it is most preferred that the polymerisation is carried out in a loop reactor/a gas-phase reactor combination.

Preferably, the polymerisation conditions in the preferred two-stage method are so chosen that the comparatively low-molecular polymer having no content of comonomer is produced in one stage, preferably the first stage, owing to a high content of chain-transfer agent (hydrogen gas), whereas the high-molecular polymer having a content of comonomer is produced in another stage, preferably the second stage. The order of these stages may, however, be reversed.

In the preferred embodiment of the polymerisation in a loop reactor followed by a gas-phase reactor, the polymerisation temperature in the loop reactor preferably is 85 to 115° C., more preferably is 90 to 105° C., and most preferably is 92 to 100° C., and the temperature in the gas-phase reactor preferably is 70 to 105° C., more preferably is 75 to 100° C., and most preferably is 82 to 97° C.

A chain-transfer agent, preferably hydrogen, is added as required to the reactors, and preferably 100 to 800 moles of $H_2$/kmoles of ethylene are added to the reactor, when the LMW fraction is produced in this reactor, and 50 to 500 moles of $H_2$/kmoles of ethylene are added to the gas phase reactor when this reactor is producing the HMW fraction.

Preferably, the base resin of the polyethylene composition is produced with a rate of at least 5 tons/h, more preferably at least 10 ton/h, and most preferably at least 15 tons/h.

In the production of the composition of the present invention, preferably a compounding step is applied, wherein the composition of the base resin, i.e. the blend, which is typically obtained as a base resin powder from the reactor, is extruded in an extruder and then pelletised to polymer pellets in a manner known in the art.

Optionally, additives or other polymer components can be added to the composition during the compounding step in the amount as described above. Preferably, the composition of the invention obtained from the reactor is compounded in the extruder together with additives in a manner known in the art.

The extruder may be e.g. any conventionally used extruder. As an example of an extruder for the present compounding step may be those as supplied by Japan steel works, Kobe steel or Farrel-Pomini, e.g. JSW 460P.

In one embodiment, the extrusion step is carried out using production rates of at least 400, at least 500, at least 1000 kg/h may be used in said compounding step.

In another embodiment the compounding step can be effected with production rate of that least 5 tons/h, preferably at least 15 tons/h, more preferably at least 20 or 25 tons/h or even at least 30 or more tons/h, such as at least 50, such 1-50, preferably 5-40, 10-50, in some embodiments 10-25 tons/h.

Alternatively, production rates at least 20 tons/h, preferably at least 25 tons/h, even at least 30 tons/h, e.g. 25-40 tons/h may be desired during the compounding step.

Preferably, in said extrusion step, a total SEI (specific energy input) of the extruder may be at least 150, 150-400, 200-350, 200-300 kWh/ton.

It is known that the temperature of the polymer melt may vary in the extruder, the highest (max) melt temperature of the composition in the extruder during the extrusion step is typically more than 150° C., suitably between 200 to 350° C., preferably 250 to 310° C., more pref. 250 to 300° C.

Still further, the present invention relates to an injection moulded article, preferably a caps or closure article, comprising a polyethylene composition as described above and to the use of such a polyethylene composition for the production of an injection moulded article, preferably a cap or closure.

Injection moulding of the composition hereinbefore described may be carried out using any conventional injection moulding equipment. A typical injection moulding process may be carried out at a temperature of 190 to 275° C.

Still further, the present invention relates to a compression moulded article, preferably a caps or closure article, comprising a polyethylene composition as described above and to the use of such a polyethylene composition for the production of a compression moulded article, preferably a cap or closure.

Preferably, the composition of the invention is used for the production of a caps or closure article.

EXPERIMENTAL AND EXAMPLES

1. Definitions and Measurement Methods a) Molecular Weight

The weight average molecular weight $M_w$ and the molecular weight distribution (MWD=$M_w/M_n$ wherein $M_n$ is the number average molecular weight and $M_w$ is the weight average molecular weight) is measured by a method based on ISO 16014-4:2003. A Waters 150CV plus instrument was used with column 3×HT&E styragel from Waters (divinylbenzene) and trichlorobenzene (TCB) as solvent at 140° C. The column set was calibrated using universal calibration with narrow MWD PS standards (the Mark Howings constant K: $9.54*10^{-5}$ and a: 0.725 for PS, and K: $3.92*10^{-4}$ and a: 0.725 for PE). The ratio of $M_w$ and $M_n$ is a measure of the broadness of the distribution, since each is influenced by the opposite end of the "population".

b) Density

All densities are measured according to ISO 1183/D.

c) Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR is determined at 190° C. and may be determined at different loadings such as 2.16 kg ($MFR_2$), 5 kg ($MFR_5$) or 21.6 kg ($MFR_{21}$).

d) Shear Thinning Index SHI

Dynamic rheological measurements were carried out with a rheometer, namely Rheometrics RDA-II QC, on compression moulded samples under nitrogen atmosphere at 190° C. using 25 mm diameter plates and plate geometry 1.2 mm gap. The oscillatory shear experiments were done within the linear viscosity range of strain at frequencies from 0.05 to 300 rad/s (ISO 6721-1).

The values of storage modulus (G'), loss modulus (G") complex modulus (G*) and complex viscosity (eta*) were obtained as a function of frequency (omega). Eta(100 rad/s) is used as abbreviation for the complex viscosity at 100 rad/sec shear rate.

Shear thinning index (SHI), which is correlating with MWD and is independent of $M_w$, was calculated according to Heino ("Rheological characterization of polyethylene fractions" Heino, E. L., Lehtinen, A., Tanner J., Seppälä, J., Neste Oy, Porvoo, Finland, Theor. Appl. Rheol., Proc. Int. Congr. Rheol, $11^{th}$ (1992), 1, 360-362, and "The influence of molecular structure on some Theological properties of polyethylene", Heino, E. L., Borealis Polymers Oy, Porvoo, Finland, Annual Transactions of the Nordic Rheology Society, 1995.)

SHI value is obtained by calculating the complex viscosities $eta_{(1)}$ and $eta_{(100)}$ at a constant shear stress of 1 kPa and 100 kPa, respectively. The shear thinning index $SHI_{(1/100)}$ is defined as the ratio of the two viscosities $eta_{(1)}$ and $eta_{(100)}$.

The definitions and measurement conditions are also described in detail on page 8 line 29 to page 11, line 25 of WO 00/22040.

e) Charpy Impact Strength

Charpy impact strength was determined according to ISO 179:2000 on V-notched samples at 23° C. (Charpy impact strength (23° C.)) and −20° C. (Charpy impact strength (−20° C.))

f) Spiral Flow

Spiral Test is carried out using an Engel ES330/65 cc90 injection moulding apparatus with a spiral mould and pressure of 600, 1000 or 1400 bar screw diameter: 35 mm
max. piston displacement: 150 cm³
spec. injection pressure: 600, 1000, or 1400 bar
tool form: oval form; provided by Axxicon; thickness 2 mm, breadth: 5 mm
temperature in pre-chamber and die: 230° C.
temperature in zone 2/zone 3/zone 4/zone 5: 230° C./230° C./225° C./200° C.
injection cycle: injection time including holding: 10 s cooling time: 15 s
injection pressure: Follows from the predetermined length of the testing material.
dwell pressure=injection pressure
screw speed: 30 rpm
system pressure: 10 bar
metering path: should be chosen so that the screw stops 20 mm before its final position at the end of the dwell pressure.
tool temperature: 40° C.

The spiral flow length can be determined immediately after the injection operation.

g) Environmental Stress Crack Resistance

Environmental stress crack resistance (ESCR) was determined according to ASTM 1693, condition B at 50° C. and using 10% Igepal co-630.

h) Tensile Properties

Tensile properties were measured on injection moulded samples according to ISO 527-2:1993. Tensile modulus was measured at a speed of 1 mm/min.

2. Examples

Polyethylene compositions 1 to 5 according to the invention were produced using the following procedure:

Into a 500 dm³ loop reactor, operated at 95° C. and 57 bar, was introduced 37 kg/hour ethylene, 59 kg/hour propane, 53 g/hour hydrogen and the polymerisation catalyst Lynx 200, a $MgCl_2$ supported titanium containing catalyst available from Engelhard Corporation Pasadena, U.S.A., in a quantity such that PE production rate was 36 kg PE/hour.

The polymer (containing the active catalyst) was separated from the reaction medium and transferred to a gas phase reactor, operated at 95° C. and 20 bar, where additional hydrogen, ethylene and 1-butene comonomer were added so as to produce a polyethylene at 30 kg/hour. The reaction conditions applied and the materials properties are listed in Tables I and II.

In Table II, three commercially available polyethylene compositions were also evaluated (Comparative Examples 6, 7 and 8).

Test specimen (dog bones) were produced from all compositions by injection moulding on an Engel ES 330/65 cc90. The test specimen were made in accordance with ISO 294. The temperature of the melt was 210° C., and the tool held a temperature of 40° C. Holding pressure at 25 s and total cycle time of 45 s.

The data in Table II show that the composition of the invention has a much higher shear thinning index than conventional unimodal or bimodal HDPE used for injection moulding, but, at the same time, yields injection moulded articles with good mechanical properties. Accordingly, the composition hereinbefore described will be easier to injection mould and will facilitate high throughputs while yielding injection moulded products of high quality.

TABLE I

|  |  | 1 | 2 | 3 | 4 | 5 |
|---|---|---|---|---|---|---|
| loop reactor |  |  |  |  |  |  |
| Temperature | ° C. | 95 | 95 | 95 | 95 | 95 |
| Pressure | bar | 57 | 57 | 57 | 57 | 57 |
| [$C_2$] | mol % | 2.1 | 2.1 | 2.1 | 2 | 2.6 |
| $H_2/C_2$ ratio | mol/kmol | 402 | 426 | 427 | 420 | 335 |
| $MFR_2$ | g/10 min | 330 | 400 | 400 | 390 | 320 |
| Density | kg/m³ | >965 | >965 | >965 | >965 | >965 |
| gas phase reactor |  |  |  |  |  |  |
| Temperature | ° C. | 95 | 95 | 95 | 95 | 95 |
| [$C_2$] | mol % | 8 | 10 | 8 | 8 | 11 |
| $H_2/C_2$ ratio | mol/kmol | 189 | 221 | 249 | 239 | 165 |
| $C_4/C_2$ ratio* | mol/kmol | 42 | 37 | 13 | 18 | 20 |
| Split | weight % | 45 | 51 | 45 | 45 | 40 |

*In all examples 1-butene was comonomer was added to the gas phase reactor. All samples had a content of 1-butene of 0.2 wt %.

TABLE II

|  | 1 | 2 | 3 | 4 | 5 | 6 Comp. | 7 Comp. | 8 Comp. |
|---|---|---|---|---|---|---|---|---|
| $MFR_2$ (190° C., 2.16 kg)(g/10 min) | 1.5 | 1.2 | 1.1 | 1.5 | 2.3 | 2.2 | 1.9 | 2.4 |
| $MFR_5$ (190° C., 5 kg)(g/10 min) | 6.4 | 4.8 | 4.4 | 6.6 | 8.8 |  |  |  |
| MWD | 26 |  |  | 26 |  | 8.9 | 6.7 | 7.1 |
| Mw (kD) | 190 |  |  | 180 |  | 160 | 150 | 135 |
| Density (kg/m³) | 957.5 | 956.5 | 960.9 | 960 | 960.4 | 951.4 | 953.1 | 953 |
| $SHI_{(1/100)}$ | 22 | 17 | 23 | 20 | 14 | 5.1 | 4.3 | 4.4 |
| −10.58 log $MFR_2$ [g/10 min]/(g/10 min) + 12.94 | 11.06 | 12.09 | 12.50 | 11.06 | 9.08 | 9.28 | 10.21 | 8.92 |
| Spiral Test 600 bar (cm) | 34.4 | 30.5 | 31.2 | 33.1 | 36 | 27.5 | 24 | 26 |
| Spiral Test 1000 bar (cm) | 49.3 | 43.7 | 46.1 | 49 | 51.4 | 41.3 | 35.3 | 37.5 |
| $2MFR_2$ [g/10 min]cm/(g/10 min) + 41 | 44 | 43.4 | 43.2 | 44 | 45.6 | 45.4 | 44.8 | 45.8 |

TABLE II-continued

|  | 1 | 2 | 3 | 4 | 5 | 6 Comp. | 7 Comp. | 8 Comp. |
|---|---|---|---|---|---|---|---|---|
| Spiral Test 1400 bar (cm) | 63.7 | 57.6 | 60.3 | 64.1 | 67.1 |  |  |  |
| Properties of injection moulded test specimen |  |  |  |  |  |  |  |  |
| ESCR-B (h) | 110 | 75 | 45 | 80 | 45 |  | 19 | 19 |
| Tensile modulus (MPa) | 940 | 910 | 1020 | 1000 | 940 | 870 | 860 | 860 |
| Eta(100 rad/s) (Pas) | 717 | 855 | 830 | 731 | 767 |  |  | 978 |
| Charpy (23° C.) | 8.7 | 12 | 15 | 9.9 | 8.8 |  |  |  |
| Charpy (−20° C.) | 5.4 | 6.7 | 7.3 | 6.3 | 5.5 |  |  |  |

The invention claimed is:

1. A polyethylene composition, wherein the composition has:
   (i) an $MFR_2$, determined according to ISO 1133 at 190° C. and at a loading of 2.16 kg, of 0.1 to 100 g/10 min, and a spiral flow,
   (ii) the spiral flow and the $MFR_2$ of the composition satisfy the following relation:

Spiral flow$_{(1000\ bar)}$ (cm)>2$MFR_2$ (g/10 min)cm/(g/10 min)+41, (iii) an environmental stress crack resistance ESCR of 10 h or more, and
   (iv) a density of 930 kg/m³ or higher.

2. The polyethylene composition according to claim 1, wherein the composition has a shear thinning index $SHI_{(1,100)}$, wherein the $SHI_{(1,100)}$ and the log $MFR_2$ of the composition satisfy the following relation:

$SHI_{(1,100)} \geq -10.58 \log MFR_2$ (g/10 min)/(g/10 min)+12.94.

3. The polyethylene composition according to claim 2 or 1, wherein the shear thinning index $SHI_{(1,100)}$ and the log $MFR_2$ of the composition satisfy the following relation:

$SHI_{(1,100)} \leq 12.44 \log MFR_2$ (g/10 min)/(g/10 min)+30.5.

4. The polyethylene composition according to claim 2 or 1 wherein the composition has a shear thinning index $SHI_{(1,100)}$ of at least 4.

5. The polyethylene composition according to claim 2 or 1 wherein the composition has an $MFR_2$ of 0.5 to 50 g/10 min.

6. The polyethylene composition according to claim 2 or 1 wherein the composition has a tensile modulus of at least 800 MPa.

7. The polyethylene composition according to claim 2 or 1 wherein the composition has a molecular weight distribution MWD of 10 to 60.

8. The polyethylene composition according to claim 2 or 1 wherein the composition has a density of 940 kg/m³ or higher.

9. The polyethylene composition according to claim 2 or 1 wherein the composition is produced in a multistage reaction.

10. The polyethylene composition according to claim 2 or 1 which comprises:
    (A) a first ethylene homo- or copolymer fraction, and
    (B) a second ethylene homo- or copolymer fraction, wherein fraction (A) has a lower weight average molecular weight than fraction (B).

11. The polyethylene composition according to claim 10 wherein fraction (A) has an $MFR_2$ of 10 g/10 min to 1000 g/10 min.

12. The polyethylene composition according to claim 10 wherein fraction (A) is an ethylene homopolymer.

13. The polyethylene composition according to claim 10 wherein fraction (B) is an ethylene copolymer with 0.001 mol % to 1.5 mol % of an alpha-olefin comonomer.

14. An injection molded or compression molded article, comprising the polyethylene composition according to any of claim 2 or 1.

15. The injection molded or compression molded article according to claim 14, wherein the article is a cap or closure.

16. A process of preparing the injection molded or compression molded article according to claim 14 wherein the process comprises an injection molding or compression molding step, respectively.

17. A process comprising the steps of:
    i) polymerizing ethylene monomers, and optionally one or more alpha-olefin comonomers, in the presence of a Ziegler-Natta catalyst to obtain a first ethylene homo- or copolymer fraction (A),
    ii) polymerizing ethylene monomers, and optionally one or more alpha-olefin comonomers, in the presence of a Ziegler-Natta catalyst to obtain a second ethylene homo- or copolymer fraction (B) having a higher average molecular weight than fraction (A),
    wherein the second polymerization step is carried out in the presence of the polymerization product of the first step, so as to form a polyethylene composition having:
    (i) an $MFR_2$ of 0.1 to 100 g/10 min, determined according to ISO 1133 at 190° C. and at a loading of 2.16 kg, of 0.1 to 100 g/10 min, and a spiral flow,
    (ii) the spiral flow and the $MFR_2$ of the composition satisfy the following relation:

Spiral flow$_{(1000\ bar)}$ (cm) $\geq$ 2$MFR_2$ (g/10 min)cm/(g/10 min)+41, (iii) an environmental stress crack resistance ESCR of 10 h or more, and
    (iv) a density of 930 kg/m³ or higher.

18. The process according to claim 17 wherein the polymerization to obtain fraction (A) is carried out in a loop reactor.

19. The process according to claim 17 wherein the polymerization to obtain fraction (B) is carried out in a gas phase reactor.

20. The process according to claim 17 wherein the first polymerization step is preceded by a prepolymerization step.

* * * * *